United States Patent [19]

Orlicki et al.

[11] Patent Number: 4,942,343
[45] Date of Patent: Jul. 17, 1990

[54] TORQUE MEASURING AND TRANSMITTING SYSTEM FOR A WEB SPOOLING MECHANISM

[75] Inventors: David M. Orlicki, Rochester; Bruce E. Koppe, Caledonia; Thomas W. Palone, Rochester, all of N.Y.

[73] Assignee: Eastman Kodak Company, Rochester, N.Y.

[21] Appl. No.: 231,302

[22] Filed: Aug. 11, 1988

[51] Int. Cl.$^5$ .............................................. B65H 77/00
[52] U.S. Cl. ........................................ 318/6; 318/652
[58] Field of Search ................... 318/6, 653, 687, 689, 318/652, 676, 7, 475, 489, 648, 652, 160; 66/147, 160; 73/1 C

[56] References Cited

U.S. PATENT DOCUMENTS

| | | |
|---|---|---|
| 2,228,032 | 5/1937 | MacGregor et al. . |
| 2,306,361 | 10/1942 | Stuart . |
| 2,886,751 | 5/1959 | Gilbert ............................ 318/689 X |
| 2,940,232 | 4/1956 | Wallace et al. . |
| 3,304,705 | 2/1967 | Rathje et al. ............................ 318/6 |
| 3,984,701 | 10/1976 | Pieper . |
| 4,048,547 | 9/1977 | Havard et al. ........................ 318/6 X |
| 4,136,559 | 1/1979 | Brown . |
| 4,276,499 | 6/1981 | Masuda et al. ................... 318/653 X |
| 4,347,993 | 9/1982 | Leonard ................................ 318/6 X |
| 4,406,983 | 9/1983 | Ramirez ................................ 318/653 |
| 4,513,627 | 4/1985 | Kohama et al. . |
| 4,513,628 | 4/1985 | Kohama et al. . |
| 4,550,618 | 11/1985 | Kohama et al. . |
| 4,604,575 | 8/1986 | Shimizu et al. ................. 318/653 X |

FOREIGN PATENT DOCUMENTS

| | | | |
|---|---|---|---|
| 22677 | 9/1948 | Finland .................................. | 318/6 |
| 559116 | 2/1944 | United Kingdom . | |

Primary Examiner—William M. Shoop, Jr.
Assistant Examiner—A. Jonathan Wysocki
Attorney, Agent, or Firm—G. Herman Childress

[57] ABSTRACT

A web spooling mechanism has a chuck that is coupled to a spool for rotating the spool to wind a length of web material onto the spool. Torque is transmitted from a drive shaft to the chuck through a spring coupled to the shaft and the chuck. A transducer measures the angular relationship between the shaft and the chuck throughout a range of relative angular positions therebetween. The transducer provides a signal indicative of that angular relationship, and the signal is transmitted to a controller that regulates the torque applied by the drive shaft. The position of the chuck relative to the drive shaft during web winding operation is a function of tension transients in the web. Since the system adjusts the torque of the drive shaft as a function of the angular relationship of the chuck and drive shaft, the system is effective to reduce tension transients in the web being wound onto the spool.

6 Claims, 5 Drawing Sheets

4,942,343

TORQUE MEASURING AND TRANSMITTING SYSTEM FOR A WEB SPOOLING MECHANISM

BACKGROUND OF THE INVENTION

The present invention relates to a system for measuring and transmitting a controlled torque from a drive shaft to a chuck of a web spooling mechanism in a way which reduces tension transients in a web as the web is wound onto a spool coupled to the chuck.

In order to maximize spooling efficiency, it is important to wind web material on a spool at a very high angular velocity in a very short cycle time. For example, it would be desirable to wind approximately 1.5 to 2.0 meters of photographic film onto a spool at peak angular velocities of about 7,000 rpm in a cycle time of 500 to 700 milliseconds. The film to be wound onto the spool is fed through a pair of metering rolls to the spool, and during the winding operation the portion of the film between the spool and the metering rolls is under tension.

The tension in the film being wound onto the spool may change rapidly for several reasons. More specifically, a film spool typically has a core of a generally cylindrical configuration. However, the spool core may not be precisely cylindrical, especially when the spool is molded from plastic materials. Also, one end of the film may be attached to the core by a strip of tape so that after one convolution of film is wound onto the core the film encounters a sharp change in diameter due to wrapping of the film over the end of the film attached to the core. In addition, the film spool is mounted between a rotatable spool holder, known as a tail stock, which engages one end of the spool, and a chuck which is coupled to the other end of the spool to drive the spool. This mounting of the spool is not precise and, as a result, the spool may be rotated about an axis that is offset slightly from the axis of the core of the spool. Each of these factors result in periodic angular acceleration of the spool and winding mechanism inertia during winding that are generally characterized as "radial runout". Such acceleration induces high frequency periodic tension transients in the film which are linearly proportional to the sum of the spool inertia and the inertia of the mechanism rigidly coupled to the spool. The inertia of the mechanism coupled to the spool is typically several orders of magnitude more than that of the film spool. The factors that contribute to radial runout are clearly undesirable, especially at the very high angular velocities and short cycle times mentioned previously. Accordingly, it is desirable to provide a system for transmitting a controlled torque to the spool during winding operations while decoupling the inertia of the winding motor and related mechanism from that of the chuck and spool in order to reduce tension transients in the web.

If film is wound onto a spool while the film is under an excessive amount of tension so called "pressure marks" can be formed on the film. Pressure marks are formed at the point where the film wraps over the leading edge of the film on the spool while the film is being subjected to excessively high tension. This defect can occur not only in the first convolution of film but in successive convolutions as well. Pressure marks can be avoided by controlling tension in the film.

In some winding and spooling apparatus it is possible to contact the web directly to sense the tension in the web and then control the wind up apparatus to maintain the desired tension in the web. However, in prior film spooling apparatus there is little or no space available for such control apparatus. Also, photographic film is easily scratched by contact-type sensors, and film is not acceptable for use when scratched in the image areas of the film. Accordingly, it is not practical to use such film tension sensing and control apparatus in spooling mechanisms for photographic film.

It is known in the art to provide a torque meter, dynamometer, or the like for measuring the amount of torque being applied from a prime mover to a load. Some such prior systems employ incremental encoders on opposite ends of a torsionally stressed element but process the output in a way which precludes torque angle measurement at zero angular velocity. Such devices are not practical for use with web winding apparatus to solve the problem of isolation of apparatus inertia from a web, and avoiding the problems of runout as discussed above.

SUMMARY OF THE INVENTION

Accordingly, is an object of the invention to control tension in a web as it is wound onto a spool and, more specifically, to control the tension in a way which avoids the problems associated with radial runout of the spool. A further object is to decouple the inertia of a winding mechanism from the inertia of a spool during a winding operation. Another object of the invention is to isolate the load of a spool from the inertial load of its driving motor. Another object is to provide a measure of the torque between a drive shaft and a driven element completely independent of the mean rotational speed of the system.

The present invention relates to an apparatus for controlling the tension in a web as it is being wound onto a spool. The apparatus has a chuck for rotating the spool to wind the web onto the spool, and a motor shaft for driving the chuck. The web encounters changes in tension as it is wound onto the web with such tension changes subjecting the chuck to a variable load. The improvement comprises a spring coupling the shaft to the chuck for effecting rotation of the chuck by the shaft while isolating the chuck from the inertia of the motor. An angle transducer is coupled to the motor shaft and the chuck for detecting the instantaneous relative positions of the shaft and the chuck, and for providing a signal indicative of such relative positions. A first portion of the transducer is carried by the motor shaft for rotation therewith, and a second portion of the transducer is movable with the chuck and therefor subject to the changing load encountered by the chuck in response to changes in the tension of the web as it is wound onto the spool. A motor controller receives a signal from the transducer and controls the motor in response to the signal so that the torque applied by the motor shaft to the spring for driving the chuck varies in response to changes in the tension in the web as it is wound onto the spool.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Initially, the invention will be generally described with reference to FIG. 1 of the drawings. This general description will be followed with more detailed descriptions of an angle transducer and a specific embodiment of the system of the invention.

Figure 1:
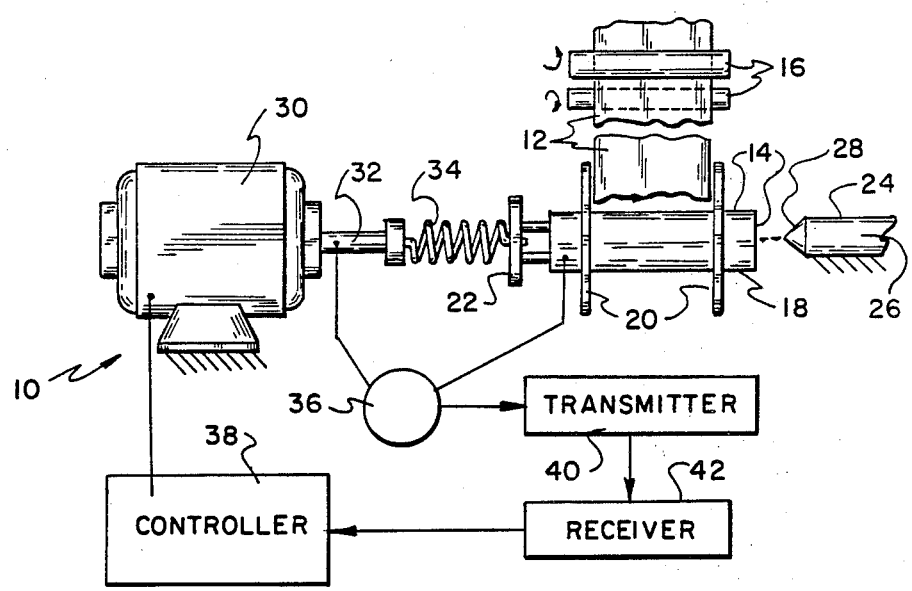
FIG. 1 is a diagrammatic view generally disclosing a system of the invention.

Referring now to FIG. 1 of the drawings, a system of the invention, generally designated 10, can be used for winding a length of film 12 or other web material onto a spool 14. The film is delivered to the spool through a pair of metering rolls 16, and a length of the film sufficient to be wound onto the spool can be stored in an accumulator (not shown) upstream of the metering rolls.

The spool 14 comprises a generally cylindrical core 18 on which the film is wound, and a pair of flanges 20 which project radially outwardly from the core. As explained earlier, the end of the film can be attached to the core 18 by a piece of tape, not shown. When the spool is located in the spooling mechanism it is mounted between a chuck 22 and a mounting member 24 commonly referred to as a "tail stock". The tail stock comprises a generally cylindrical portion 26 that is rotatable about its axis. One end of the tail stock has a conical tip 28 that at least partially enters a hole or opening in the right end of the spool 14. This mounting of the spool enables it to generally rotate about its axis during spooling operations. As pointed out hereinbefore, the core 18 of the spool may not be perfectly cylindrical due to inaccuracies in its manufacture, and the chuck and tail stock may not mount the spool for rotation precisely about its axis. This results in runout, and the system of the invention is designed to compensate for runout.

System 10 comprises a motor 30 having a drive shaft 32. Drive shaft 32 is coupled to the chuck 22 through a flexible coupling shown as a spring 34. Although spring 34 is illustrated as a linear spring, it can be other types of flexible couplings, such as a clock spring.

An angle transducer 36 is coupled to the drive shaft 32 and chuck 22 or spool 14. The transducer is illustrated only diagrammatically in FIG. 1, and will be described in more detail later. Transducer 36 is effective to measure the instantaneous differential angle between the motor shaft 32 and the chuck 22 and spool 14. The torque transmitted from the motor 30 to the spool is proportional to this instantaneous differential angle.

Figure 2:
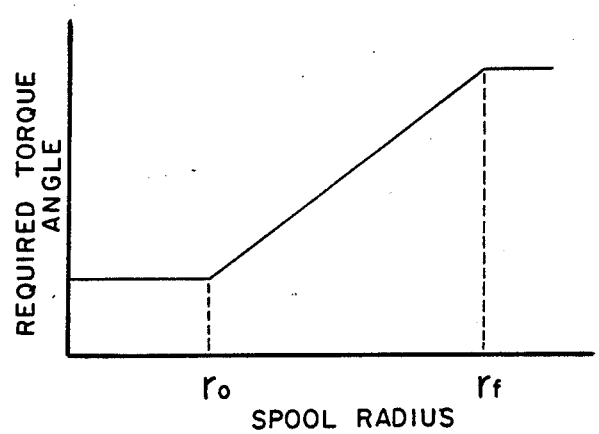
FIG. 2 is a view depicting the relationship between the torque angle and spool radius of the system shown in FIG. 1.

A signal produced by transducer 36 is provided to a motor controller 38, either directly or through a transmitter 40 and receiver 42. The controller is connected to motor 30 and adjusts the speed of the motor in response to a signal received from the transducer. More specifically, the controller 38 compares the angle measured by transducer 36 to an appropriate reference level stored in the controller, and this comparison is used to control the torque of the winding motor 30. The reference angle level, and thereby the winding torque from motor 30, can be varied during the winding of film onto the spool to obtain substantially constant film tension as required for avoiding the problems discussed hereinbefore. For example, FIG. 2 of the drawings illustrates the relationship between the spool radius r as it varies between the value $r_0$, representing the beginning radius of the spool, and $r_f$ representing the final radius of the wound spool, and the torque angle required for constant tension in the film during the winding operation. For constant tension, winding torque is increased linearly with computed spool radius as shown in FIG. 2. Also, the value $r_0$ indicates that even at the initial condition (before film winding begins) some torque can be applied by the motor drive shaft 32 to the chuck. Thus it is important to be able to measure the torque angle even before winding begins. In addition to providing a means for transmitting controlled torque to the spool, the compliant coupling of the spring 34 also acts to isolate inertia of the motor 30 from the periodic acceleration of the spool due to runout.

One transducer 36 suitable for use with system 10 is the unique inductive transducer described later in detail which measures the spring windup in the rotating frame of reference. After a brief review of pertinent magnetic theory relevant to the operation of an inductive transducer, a preferred embodiment of such transducer will be described. This will be followed by a more detailed description of the system of the invention illustrating the inductive transducer integrated into the system.

Figure 3:
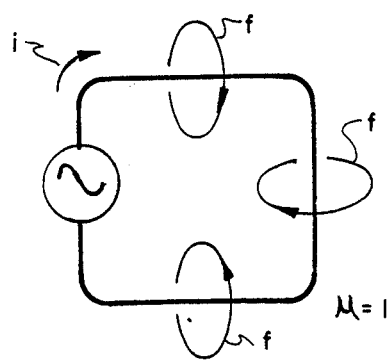
FIGS. 3-6 are diagrammatic views for explaining magnetic theory applicable to an inductive transducer used in the system of the invention.

The angle transducer defined in more detail later is fundamentally a variable inductor, the impedance of which is adjusted by changing the permeability of magnetic flux paths in the space surrounding a wire coil. Consider a single turn coil of wire driven by a sinusoidal current source as shown in FIG. 3. Instantaneous directions of the loop current and the flux lines surrounding the loop are shown by the arrows. The current i flowing through the wire gives rise to magnetic flux lines surrounding the wire which are linearly magnitude dependent on the magnetic permeability of the space surrounding the wire. In FIG. 3, the permeability of the surrounding region is that of free space. For illustrative purposes we show three flux lines, each of magnitude f linked by the current i. The inductance of a coil is defined as the flux linked per unit current flowing through the coil. In this case there is an inductance of three units.

Figure 4:
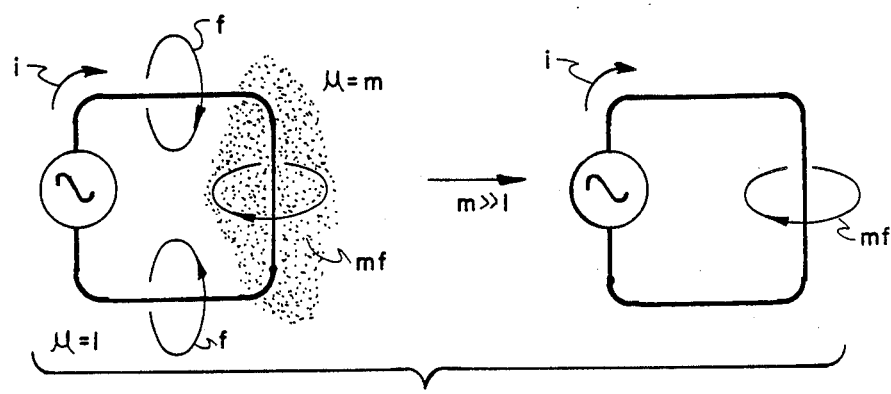

Suppose now that the same coil is placed in a new environment such that only the right most link of the coil is surrounded by a space with a permeability m times greater than that of free space, as shown in FIG. 4. The flux linked by the coil increases from 3f to (m+2)f for the same current, so the coil's inductance increases by a factor of (m+2)/3. When the permeability m of the right most link is much greater than that of free space, the total inductance is essentially determined by the right most link, as shown at the right side of FIG. 4.

By arranging the geometry of the coil and high permeability materials appropriately, the effect of selected flux links on coil inductance can be reduced to a negligible percentage. Such an arrangement is shown in FIG.

5. A coil of wire 50 is located in a groove 52 in the face of a circular bobbin 54 of high permeability material with a cross section as shown. It is placed in opposition to another bobbin 56 with a similarly dimensioned groove 58 in its face. The two bobbins are separated by a narrow air gap 60. Flux $f_1$ has a small percentage of its path through the low permeability region (air) compared to that of flux $f_2$. Consequently, $f_1$ has much greater magnitude than $f_2$ and its behavior sets the inductance of the coil with negligible contribution from $f_2$.

The goal in designing the transducer described in detail later is to use shaped flux paths around a coil of wire to vary its inductance. It will be apparent from the foregoing discussion that selected flux paths may be enhanced to the point of dominance over other flux paths in determining the inductance of a coil by routing the selected flux paths through regions of high magnetic permeability. Similarly, the other flux paths are rendered less attractive by inclusion of segments of the flux paths in regions of low permeability. Typically the regions of low permeability are in the form of long air gaps. A more compact design would result if undesired paths could be eliminated by blocking them with materials having zero magnetic permeability. Although no such materials exist, a loop of wire can be configured in a single continuous turn and positioned judiciously to achieve the flux blocking effect of such a hypothetical material.

Figures 6A, 6B, 6C:
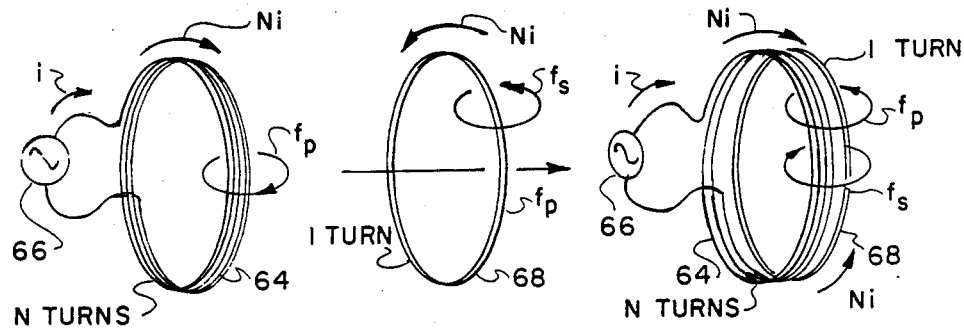

FIG. 6 illustrates the flux fields surrounding a coil of wire 64 (FIG. 6a) driven by a sinusoidal current source 66 when a single turn of wire 68 (FIG. 6b), shorted on itself, is placed in close proximity to the coil (FIG. 6c). FIG. 6a shows that a sinusoidal current of i amperes through the N turns of a coil constitutes Ni units of magnetomotive force which drive a flux of $f_p$ units. As FIG. 6b illustrates, a single turn of wire linking $f_p$ units of flux will have induced in it Ni amperes of current. At the same time, the Ni amperes of current drive a flux of $f_s$ units of the opposite sense as the inducing flux $f_p$. If the shorted turn were lossless, fs would be the same amplitude as $f_p$. Now place the shorted turn in close proximity to the driven coil as shown in FIG. 6c and arrange high permeability materials (not shown) in the vicinity of the ensemble such that virtually all of the fluxes $f_p$ and $f_s$ are linked by both coils. Within limits due to wire losses in the shorted turn and the quality of the mutual magnetic coupling of the coils, the inducing and the induced fluxes cancel each other, for a net zero flux linked. The inductance of the coil is nearly zero, and the desired effect of blocking flux in the region has been achieved. The effective magnetic permeability of the flux path linked by both the driving coil and the shorted turn is zero.

Figure 5:
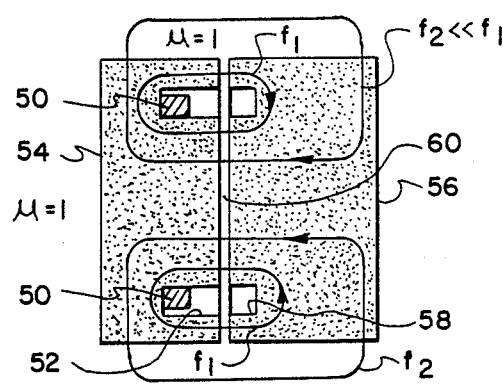
Figures 7A, 7B:
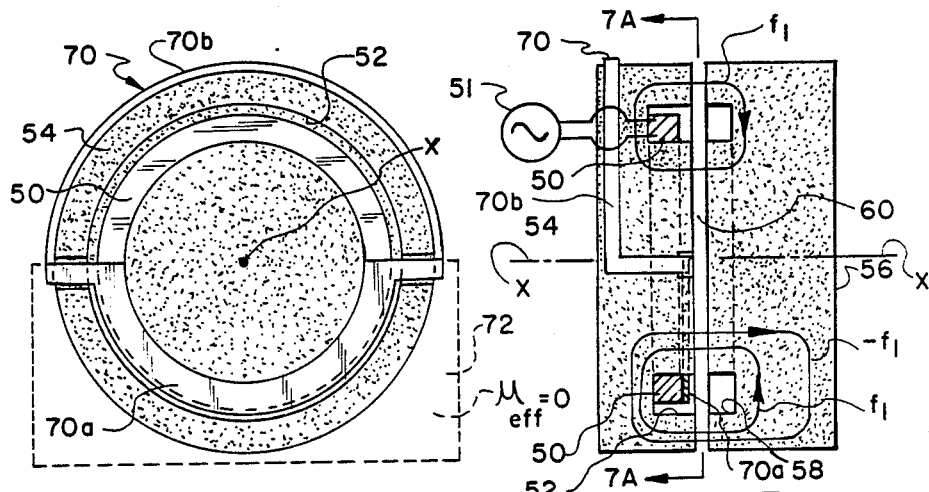
FIGS. 7-9 are diagrammatic views useful for a general understanding of an angle transducer.
Figures 8A, 8B:
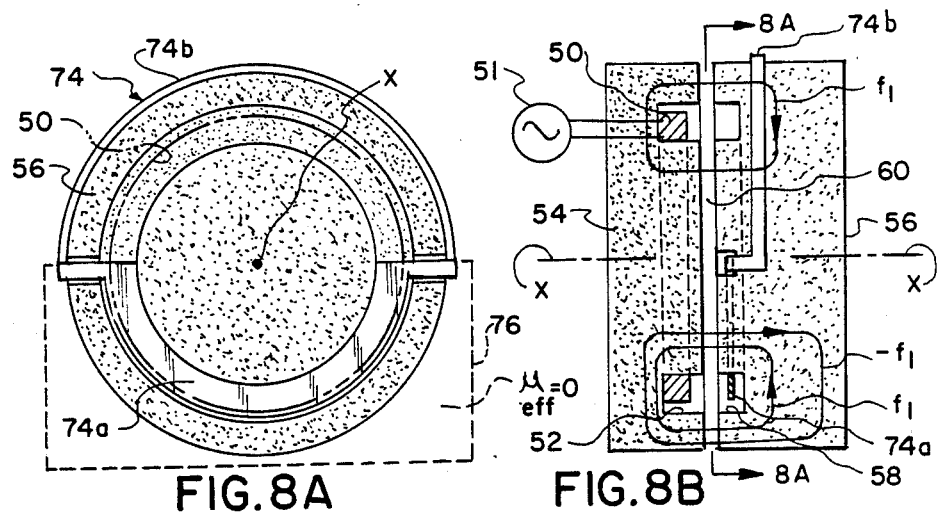
Figure 9:
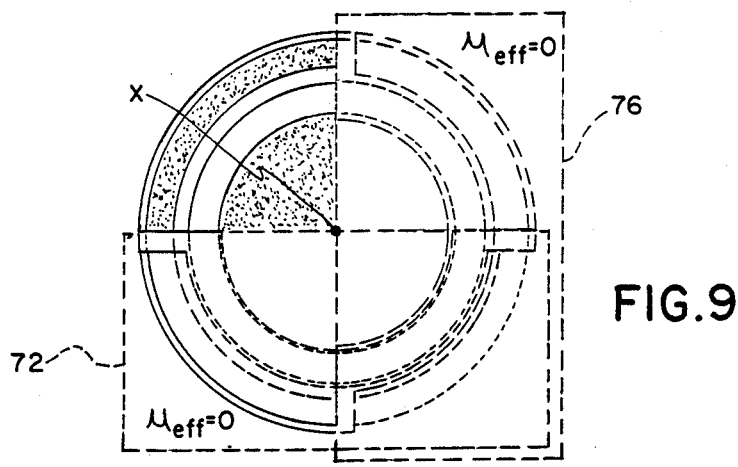

FIGS. 7-9 diagrammatically illustrate the structure of FIG. 5 with the addition of a specially routed shorted turn conductor as shown in FIG. 6. The reference numerals 50-60 in FIG. 7-9 designate the parts as described in connection with FIG. 5, and the shorted conductor is designated 70. In FIG. 7, flux path $f_1$ produced by current flow in coil 50 from source 51 is enhanced by the high permeability of the bobbin material, making flux paths outside the bobbins negligible. The shorted turn is routed so that a portion 70a of it is adjacent to coil 50 to produce zero net flux while another portion 70b of the turn 70 is spaced from the coil 50 so that the flux from the coil is unopposed by the turn. More specifically, the portion 70a of shorted turn 70 is bundled in groove 52 with the coil for the lower half of the coil's circumference and is intimately linked with flux $f_1$. Current induced in the shorted turn by the action of flux $f_1$ in this lower region gives rise to an equal but opposite flux, shown in FIG. 7b as $-F_1$, resulting in zero net flux and therefore no inductance in the bottom half of the coil. The area where the net flux is effectively zero is designated 72 in FIG. 7a.

The other (upper) half 70b of the shorted turn 70 is brought outside the bobbin 54 and is not closely linked magnetically with the sensor coil 50. Flux $f_1$ induced by the coil 50 is unopposed in the upper region of the bobbin, and this flux contributes to coil inductance. Once the shorted turn 70 is outside the bobbin pair, its path is of little consequence in terms of coil inductance. Similarly, the path of the shorted turn 70 inside the bobbins need only be linked by flux f1 to be effective, i.e., it does not need to be in groove 52 physically adjacent to coil 50. Thus, turn 70 may just as well be contained in the opposite bobbin 56 while the sensor coil 50 remains in bobbin 54. This arrangement is shown in FIG. 8 where turn 74 has portions 74a, 74b routed in the same manner as turn 70 but located in bobbin 56 instead of bobbin 54.

FIG. 8 is physically different but magnetically identical to that of FIG. 7. Thus there is an area 76 in FIG. 8 where the net flux is effectively zero, and there also is an area where flux path $F_1$ is essentially unopposed by the shorted turn 74. The inductance contribution of the coil segment magnetically linked to the shorting turn 74 is zero whether the shorting turn is physically located in bobbin 54 (FIG. 7) or bobbin 56 (FIG. 8). Both shorting turns 70, 74 can be included simultaneously and the bobbins oriented at any relative angle. With both shorting turns present the coil inductance is a function of the relative angular positions of the bobbins and the portions 70a, 74a of turns 70, 74 that block the coil inductance. By way of example, FIG. 9 shows an assembly with two turns 70, 74, as in FIGS. 7 and 8, but with bobbin 56 rotated 90° counter clockwise about axis x—x from its FIG. 8 position while bobbin 54 remains in the position shown in FIGS. 7 and 8. Thus the zero flux area 72 continues to be in the lower half of the assembly while zero flux area 76 now occupies the right half of the assembly and overlaps with area 72 in the lower right quadrant. The upper left quadrant is the only area in FIG. 9 where the coil inductance is unopposed by one of the shorted turns.

In an assembly with two shorted turns 70, 74 there are two extreme relative positions of the bobbins which result in two extreme effective coil inductance values. More specifically, when bobbin 56 is rotated 180° from its FIG. 8 position and bobbin 54 remains in its FIG. 7 position, coil inductance is zero, assuming perfect flux confinement and zero losses in the shorted turns 70, 74. In this position zero flux area 76 is non overlapping zero flux area 72. In the other extreme relative position, the shorting turns are aligned and areas 72, 76 overlap. In this position the coil inductance is at a maximum, which is one half the value it would assume if shorted turns 70, 74 were excluded altogether. Thus FIG. 9 depicts the condition where the bobbins 54, 56 are oriented at ninety degrees relative to one another so that coil inductance assumes its midpoint value.

In fact there are always inductance contributions due to stray flux paths neglected in this discussion as well as losses in the shorted turns. These factors result in a decrease in the range of inductance observed as the bobbins are rotated through their full travel, but it is fairly easy to achieve eighty percent efficiency with standard materials and tolerances.

Figure 10:
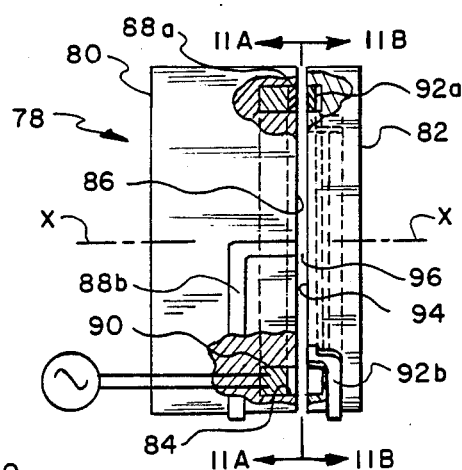
FIG. 10 is a sectional view of a preferred embodiment of the transducer.
Figure 11A:
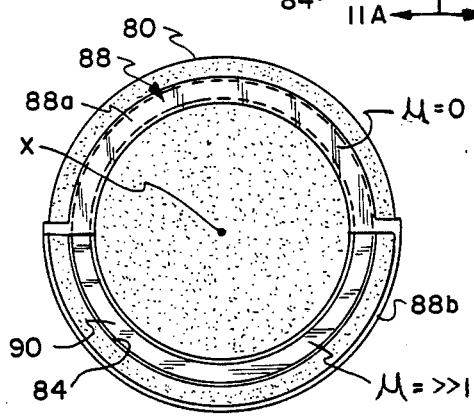
FIGS. 11a and 11b are views taken along lines 11a—11a and 11b—11b, respectively, in FIG. 10.
Figure 11B:
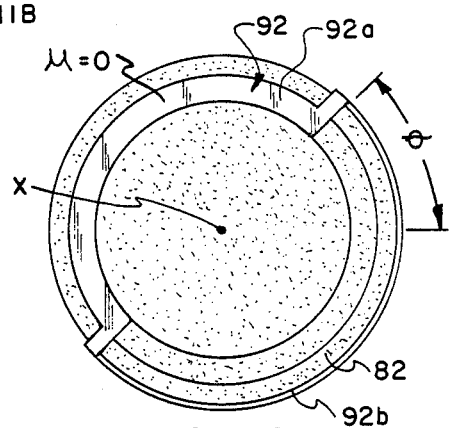

FIGS. 10 and 11 illustrate in more detail an embodiment of a transducer 78 incorporating the principles discussed above. More specifically, the transducer comprises a sensor element 80 and a target element 82, both of which are made from a material having magnetic permeability that is much greater than one. The sensor and target are similar functionally to the bobbins 54, 56 of FIGS. 7-9. The sensor 80 has an annular groove 84 formed in an end face 86.

A coil of an electrical conductor 90 is positioned in groove 84 and connected to an a.c. source. Sensor 80 has a shorted turn 88 corresponding to shorted turn 70 of FIG. 7. Turn 88 may comprise a strip of an electrical conductor, such as copper, having a first semi-circular portion 88a which lies along face 86 of the sensor and covers one half of the coil 90 in groove 84. A second semi-circular portion 88b of turn 88 extends around the outer surface of the sensor in spaced relation to the other half of the coil. In a similar manner, a shorted turn 92 of an electrical conductor has a first semi circular portion 92a on face 94 of target 82 and a second semi circular portion 92b on the outer surface of the target and spaced from face 94 of the target. Shorted turn 92 corresponds to turn 74 of FIGS. 8. As illustrated, one half of each of the shorted turns 88 and 92 are located to affect the inductance of coil 90; however, more or less of each turn can be positioned where it can be used, for this purpose, if desired.

Figure 12:
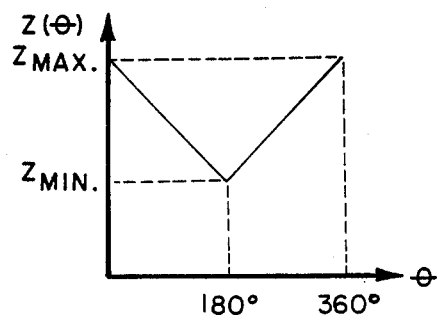
FIG. 12 is a graph showing the relationship between the angular position of parts of the transducer and the resulting impedance.

The sensor and target are located so that the faces 86, 94 are in parallel planes and in close proximity, but separated by a small air space 96. Relative movement between the sensor and target can be effected about an axis x—x passing through the center of the sensor and target. When the target is rotated about the axis relative to the sensor by an angle $\theta$ as shown in FIG. 11, the impedance of coil 90 changes to produce a signal that can be used for measuring the angular deflection of the target relative to the sensor and thus for controlling a related apparatus. FIG. 12 is a graph representing the relationship between the impedance Z and the angle $\theta$. The impedance is a maximum when portions 88a, 92a are aligned, and a minimum when the portions 88a, 92a are completely offset, i.e., when the target is rotated relative to the sensor sufficiently to offset portions 88a, 92a by 180°.

Figure 13:
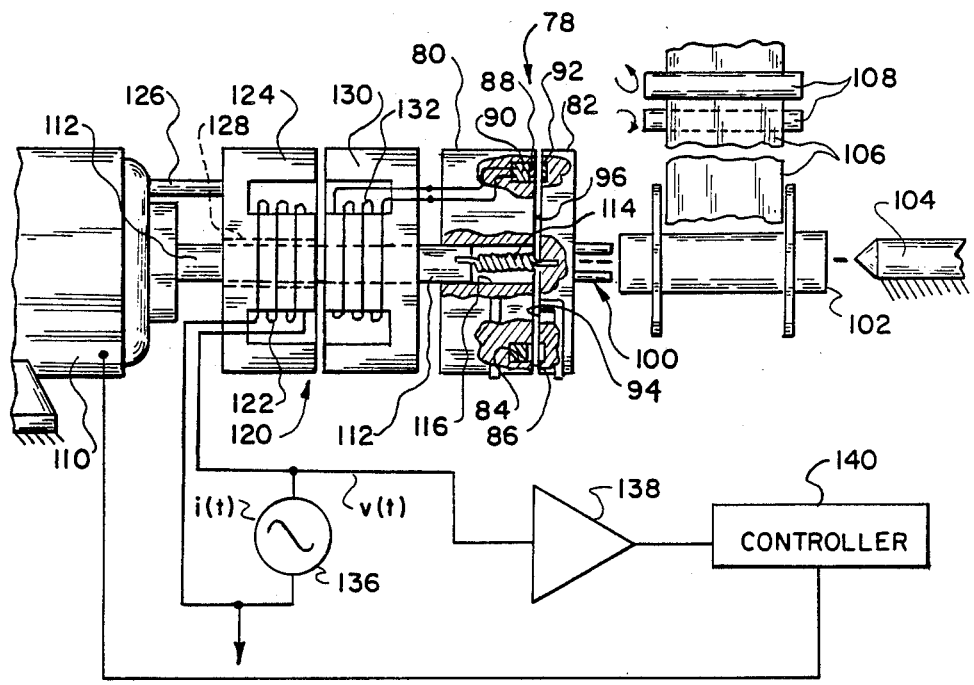
FIG. 13 is a more detailed view of a system of the invention.

FIG. 13 schematically illustrates a system for measuring and controlling the torque applied to a film spool which incorporates an angle transducer 78 as shown and described in connection with FIGS. 10 and 11. Accordingly, in FIG. 13 the same reference numerals are used to illustrate the same or similar parts of the transducer 78 as shown in FIGS. 10 and 11. A chuck 100 is connected to the target portion 82 of the transducer. The chuck can be coupled to one end of a spool 102, the other end of the spool being rotatably supported by a tail stock 104 as explained earlier. A length of film 106 or other web material advanced through metering rolls 108 can be wound onto the hub of the spool 102 in response to rotation of the chuck 100 with the target 82 of the transducer.

A servo motor 110 has a drive shaft 112 that is connected to the sensor 80 of the transducer to rotate it about its axis. Sensor 80 of the transducer is flexibly coupled to target 82 thereof through a spring 114. As schematically illustrated, spring 114 can comprise an elongated helical spring connected at one end to the target 82 of the transducer. The spring extends through a cylindrical opening 116 in the center portion of transducer sensor 80, and the other end portion of the spring is connected to the transducer portion 82. Thus, when the shaft 112 of the motor drives sensor 80, target 82 of the transducer is also driven through the flexible coupling afforded by the spring 114. This, in turn, drives the chuck 100 to rotate the spool 102. Tension transients encountered in the web 106 will be transmitted through the spool and chuck 100 to the target 82 of the transducer, thereby causing high frequency rotational movement of target 82 of the transducer relative to the sensor 80. The resulting windup of the spring is proportional to the torque being transmitted. The relative movement between the sensor and target varies the impedance of the coil 90 of the transducer.

From the foregoing it is apparent that during operation the transducer produces a signal (i.e., a change in impedance) that can be used to control motor 110 and rotation of the spool as a function of the tension transients in web 106. Also, the flexible coupling provided by spring 114 isolates the relatively high inertia of motor 110 and the associated structure between the motor and the spring from the relatively low inertia of the elements between the spring and web 106 (i.e., portion 82 of the transducer, the chuck 100, spool 102 and tail stock 104.

A rotary transformer generally designated 120 comprises a primary winding 122 on a core 124 that is either secured directly to the motor 110 by mounting member 126 or is otherwise anchored in a fixed position relative to the frame of the motor 110. Shaft 112 passes through a cylindrical opening 128 in core 124 so that the shaft rotates relative to the primary winding 122. The shaft is connected to the core 130 for the secondary winding 132 of the transformer, and the secondary winding 132 is connected directly to the winding 90 on transducer sensor 80. Transformer core 130 and sensor 80 can be integrally formed, if desired. Thus transformer winding 132 can be located on the face of sensor 80 opposite from face 86.

The output of the primary winding 122 is connected to a source 136 of sinusoidal current. Thus impedance variations of the sensor coil of the transducer are reflected through the secondary and primary windings of the transformer to provide a load to source 136. This load varies linearly with the angular windup of the torque transmitting spring 114 that couples the motor 110 to the spooling load. The peak voltage measured on the transformer primary is thus a measure of the torque transmitted to the spool. This voltage is sensed by a peak detector 138 connected to primary winding 122 and source 136. Detector 138 provides a signal to a motor controller 140 which, in turn, is coupled to the motor 110 for controlling the current to the motor, and thus the torque produced by drive shaft 112. The peak detector produces an output signal at all times even when the system is at rest or when the spring coupling is preloaded prior to starting the winding of the web onto a spool.

As indicated previously, runout of the spool 102, due to spool molding tolerances and/or slight misalignment of the axis of the spool relative to the axes of the tail stock and drive from the motor, can result in a large, periodic angular acceleration of the spool and any inertia rigidly fixed to it. The torque required to balance this inertial load induces periodic tension variations in the web 106 through the instantaneous radius of the roll of web material on the spool. The apparatus of FIG. 13 reduces the inertia rigidly attached to the spool, and accordingly these tension transients are reduced. In the FIG. 13 system, essentially the only inertia rigidly attached to the spool is that of the sensor 82 of the transducer and the chuck, which can be part of the transducer sensor. It is possible to build sensor 82 of the transducer so that its inertia is only a fraction of that of an empty spool 102. The inertia of motor 110 and the other portions of the FIG. 13 system between the motor and spring 114 are much higher than spool 102 and target 82, but the spring 114 effectively decouples this higher inertia from the spool.

The servo motor 110 driving the system is controlled in a feedback mode using the peak detected output of the transformer 120 as an error signal. The controlled variable is thus the spring windup angle $\theta$ which is measured by the transducer. Torque transmitted to the spool 102 is proportional to this angle by whatever spring rate is employed. There is no controllability restriction that requires the use of linear springs, but monotonicity of spring rate is required.

Not all torque transmitted through the spring 114 goes into tensioning the film. Some goes into accelerating the inertia of the spool through its winding velocity profile. The torque required to drive the spool 102 and transducer target 82, in the context of spooling cycle times of about 500–700 milliseconds for 1.5 to 2.0 meters of film, is quite small relative to that required to maintain the tension typically used when winding film onto a spool. Since this profile is fully known, however, it is possible to feed forward the appropriate time varying offset to the controlled spring angle to negate inertial loading effects.

A number of advantages are obtained by the apparatus of the invention. First of all, the apparatus mitigates the problems associated with runout. Tension transients in the wound web result from the product of runout induced angular acceleration and the inertia of the spool and rigidly coupled inertia. The flexible coupling between the drive shaft and spool decouples the inertia of the drive apparatus from the spool in the sense that small angular displacements due to runout transmit very little torque through the spring to the drive shaft. By reducing the inertia rigidly coupled to the spool to a negligible level relative to the spool and film, we reduce runout induced tension transients to the minimum possible level. By controlling tension transients in the web, pressure marks resulting from excessive tension are eliminated. Also, the angle transducer enables the torque appplied by the drive motor to be rapidly adjusted during winding operations to effect changes in the tension of the web as desired.

The invention has been described in detail with reference to a preferred embodiment thereof, but it will be understood that variations and modifications can be effected within the spirit and scope of the invention.

What is claimed is:

1. In a system for controlling the tension in a web as it is being wound onto a spool, the system having a chuck for rotating the spool to wind the web onto the spool and a motor having a shaft for driving the chuck, the web being subjected to changes in tension as it is wound onto the spool with such tension changes subjecting the chuck to a variable load related to the change in web tension, the improvement comprising:

a spring coupling the shaft to the chuck for effecting rotation of the chuck by the shaft, the spring enabling the chuck to move relative to the shaft in response to the variable load related to web tension while isolating the chuck from the inertia of the motor, an angle transducer coupled to the motor shaft and the chuck for detecting the instantaneous relative positions of the shaft and the chuck and for providing an output signal indicative of such relative positions, and a motor controller for receiving a signal from the transducer and controlling the motor in response to the signal so that the torque applied by the motor shaft to the spring for driving the chuck varies in response to changes in the tension in the web as it is wound onto the spool.

2. The improvement as set forth in claim 1 wherein the transducer has means for producing a magnetic flux that varies in response to relative movement between the shaft and the chuck, the output signal being a function of the magnetic flux.

3. The improvement as set forth in claim 1 wherein the transducer has a first portion carried by the motor shaft for rotation therewith and a second portion movable with the chuck and therefor subject to the changing load encountered by the chuck in response to changes in the tension of the web as it is wound onto the spool, a coil of an electrical conductor carried by one of the transducer portions, a source of a.c. voltage connected to the coil to provide magnetic flux paths about the coil, and the transducer having means for selectively blocking an area of the flux paths from the coil with the blocked area changing in response to relative movement between the transducer portions, and means for sending changes in the blocked area and changing the output signal as a function of the blocked area.

4. The improvement as set forth in claim 1 wherein the transducer has a coil of an electrical conductor carried by the first portion of the transducer, a source of a.c. voltage connected to the coil to provide magnetic flux paths around the coil, means carried by the first portion of the transducer for effectively blocking an area of the flux paths about the coil, and means carried by the second portion of the transducer for effectively blocking an area of flux paths about the coil, the blocking means being located on the transducer portions so that relative movement between the transducer portions as a web is wound onto the spool moves the blocking means relative to each other to change the total area of flux paths blocked and thereby vary the inductance of the coil, and means for sensing variations in the inductance and producing the output signal of the transducer.

5. In a system for controlling the tension in a web as it is being wound onto a spool by a web winding apparatus, the apparatus having a chuck for rotating the spool to wind the web onto the spool and a motor having a shaft for driving the chuck, the web being subjected to changes in tension as it is wound onto the spool with such tension changes subjecting the chuck to a variable load related to the change in web tension, the improvement comprising:

a spring coupling the shaft to the chuck for effecting rotation of the chuck by the shaft, the spring enabling the chuck to move relative to the shaft in response to the variable load related to web tension while isolating the chuck from the inertia of the motor, an angle transducer having a sensor connected to the motor shaft and a target connected to the chuck, the sensor and target being made from a high permeability material and being located closely adjacent to each other, a coil of an electrical conductor carried by the sensor, a source of a.c. voltage connected to the coil to provide magnetic flux paths around the coil with the high permeability material of the sensor and target enhancing the flux paths, a first endless turn on an electrical conductor carried by the sensor, the turn being routed relative to the coil for effectively blocking one area of the flux paths about the coil without blocking other areas of the flux paths, a second endless turn carried by the target for effectively blocking an area of flux paths about the coil, the turns being located on the sensor and target so that relative movement between the sensor and target as a web is wound onto the spool moves the turns relative to each other to change the total area of flux paths blocked by the turns, thereby varying the inductance of the coil and Providing a variable load on the voltage source which is a function of the instantaneous relative positions of the sensor and target connected to the motor shaft and chuck, respectively, a peak detector for sensing variation in the load and providing an output signal indicative of the load, and a motor controller for receiving the signal from the peak detector and controlling the current to the motor in response to the signal so that the torque applied by the motor shaft to the spring for driving the chuck varies in response to instantaneous changes in the tension in the web as it is wound onto the spool.

6. The improvement as set forth in claim 5 further comprising a transformer between the a.c. source and the coil, the transformer having a primary winding fixed with respect to the motor and a secondary winding rotatable with the shaft, the primary winding being connected to the source and the secondary winding being connected to the coil.

* * * * *